United States Patent
Patra et al.

(10) Patent No.: US 10,686,670 B2
(45) Date of Patent: Jun. 16, 2020

(54) OPTIMIZING PLACEMENT OF INTERNET-OF-THINGS (IOT) DEVICES TO PROVIDE FULL COVERAGE AND MINIMIZE COVERAGE OVERLAP

(71) Applicant: INTERNATIONAL BUSINESS MACHINES CORPORATION, Armonk, NY (US)

(72) Inventors: Abhay Patra, Pune (IN); Harish Bharti, Pune (IN); Rajesh Kumar Saxena, Thane (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1 day.

(21) Appl. No.: 16/106,657

(22) Filed: Aug. 21, 2018

(65) Prior Publication Data

US 2020/0067787 A1 Feb. 27, 2020

(51) Int. Cl.
*H04L 12/24* (2006.01)
*H04L 29/08* (2006.01)
*G06N 3/08* (2006.01)

(52) U.S. Cl.
CPC .......... *H04L 41/145* (2013.01); *G06N 3/084* (2013.01); *H04L 67/12* (2013.01)

(58) Field of Classification Search
CPC ........ H04L 41/145; H04L 67/12; G06N 3/084
See application file for complete search history.

(56) References Cited

U.S. PATENT DOCUMENTS

| 9,811,795 | B1* | 11/2017 | Kearns | G06F 16/355 |
| 2006/0253570 | A1 | 11/2006 | Biswas et al. | |
| 2008/0198004 | A1 | 8/2008 | Luss | |
| 2012/0321647 | A1* | 12/2012 | Breaker | C12N 15/115 424/178.1 |
| 2013/0159550 | A1 | 6/2013 | Vasseur | |
| 2015/0281653 | A1 | 10/2015 | Frangiadakis et al. | |
| 2016/0191854 | A1 | 6/2016 | Gonzalez et al. | |

(Continued)

FOREIGN PATENT DOCUMENTS

JP 2010190869 A * 9/2010 ............. G01S 13/87

OTHER PUBLICATIONS

Boukerche, A,., "Algorithms and Protocols for Wireless Sensor Networks", 2009, John Wiley & Sons, Inc., pp. 1-544, Total pp. 552 (Year: 2009).*

(Continued)

*Primary Examiner* — Un C Cho
*Assistant Examiner* — Shah M Rahman
(74) *Attorney, Agent, or Firm* — William Hartwell; Andrew D. Wright; Roberts Calderon Safran & Cole, P.C.

(57) ABSTRACT

A computer-implemented method includes: receiving, by a computing device, information regarding a range in which an Internet-of-Things (IoT) network is to be implemented; determining, by the computing device, respective detection scores for a plurality of IoT devices for each of a plurality of proposed congregation of IoT devices; determining, by the computing device, a minimum number of the plurality of IoT devices to cover the range by incorporating the detection scores into a covariance model; and outputting, by the computing device, information identifying the minimum number of the plurality of IoT devices for designing the IoT network.

18 Claims, 7 Drawing Sheets

(56) References Cited

U.S. PATENT DOCUMENTS

| | | | | |
|---|---|---|---|---|
| 2018/0060476 | A1* | 3/2018 | Kasch | H04W 16/18 |
| 2018/0197257 | A1* | 7/2018 | Bender | G06Q 50/12 |
| 2019/0182627 | A1* | 6/2019 | Thoresen | H04L 67/04 |
| 2019/0306242 | A1* | 10/2019 | Thummalapalli | H04L 67/12 |
| 2019/0327124 | A1* | 10/2019 | Lai | H04W 72/0413 |

OTHER PUBLICATIONS

Mattikalli et al., "Optimal Sensor Selection and Placement for Perimeter Defense", Sep. 2007, TEEE, pp. 1-8, Total pp. 8 (Year: 2007).*

Sweidan, H. "Resource Optimization in Wireless Sensor Networks for an Improved Field Coverage and Cooperative Target Tracking", May 2018, Michigan Technological University, Dissertation, pp. 1-150, Total pp. 179 (Year: 2018).*

Luss, H., "On Equitable Resource Allocation Problems: A Lexicographic Minimax Approach", May 1999, Telcordia Technologies, Operations Research vol. 47, No. 3, 1999, pp. 361-378 (Year: 1999).*

Krause et al., "Near-Optimal Sensor Placements in Gaussian Processes: Theory, Efficient Algorithms and Empirical Studies", Feb. 2008, Carnegie Mellon University, Journal of Machine Learning Research 9 (2008), pp. 235-284 (Year: 2008).*

Ghosh, S.K., "Art Gallery Theorems and Approximation algorithms", 2010, Tata Institute of Fundamental Research, https://pdfs.semanticscholar.org/d3cf/1a3c215a10117b36f6af938f139adb93d265.pdf, pp. 1-2 (Year: 2010).*

Kocakulak et al., "An Overview of Wireless Sensor Networks Towards Internet of Things", 2017, Bursa Technical University, Proc. IEEE 7th Annu. Comput. Commun. Workshop Conf. (CCWC), pp. 1-6 (Year: 2017).*

Mell et al., "The NIST Definition of Cloud Computing", NIST, Special Publication 800-145, Sep. 2011, 7 pages.

Wu et al., "Optimal Sensor Coverage", http://www.utdallas.edu/~dzdu/cs7301c/main.pdf, 2016, 44 pages.

Bottino et al., Abstract of "A nearly optimal sensor placement algorithm for boundary coverage", https://www.researchgate.net/publication/223823326_A_nearly_optimal_sensor_placement_algorithm_for_boundary_coverage, Nov. 2008, 5 pages.

Kumar, "Foundations of Coverage in Wireless Sensor Networks", https://etd.ohiolink.edu/!etd.send_file?accession=osu1154986262&disposition=inline, 2006, 160 pages.

Vermesan et al., "Internet of Things—From Research and Innovation to Market Deployment", http://www.internet-of-things-research.eu/pdf/IoT-From%20Research%20and%20Innovation%20to%20Market%20Deployment_IERC_Cluster_eBook_978-87-93102-95-8_P.pdf, 2014, 374 pages.

* cited by examiner

OPTIMIZING PLACEMENT OF INTERNET-OF-THINGS (IOT) DEVICES TO PROVIDE FULL COVERAGE AND MINIMIZE COVERAGE OVERLAP

BACKGROUND

The present invention generally relates to optimizing the placement of internet-of-things (IoT) devices and, more particularly, to optimizing the placement of IoT devices to provide full coverage and minimize coverage overlap.

The IoT is the network of physical devices, vehicles, home appliances and other items embedded with electronics, software, sensors, actuators, and connectivity which enables these objects to connect and exchange data. An IoT device is uniquely identifiable through its embedded computing system but is able to inter-operate within the existing Internet infrastructure.

The IoT allows objects to be sensed or controlled remotely across existing network infrastructure, creating opportunities for more direct integration of the physical world into computer-based systems, and resulting in improved efficiency, accuracy and economic benefit in addition to reduced human intervention. When IoT is augmented with sensors and actuators, the technology becomes an instance of the more general class of cyber-physical systems, which also encompasses technologies such as smart grids, virtual power plants, smart homes, intelligent transportation and smart cities.

Examples of IoT devices include heart monitoring implants, biochip transponders, cameras streaming live feeds, automobiles with built-in sensors, DNA analysis devices for environmental/food/pathogen monitoring, or field operation devices. IoT devices may collect useful data with the help of various existing technologies and then autonomously flow the data between other devices.

SUMMARY

In an aspect of the invention, a computer-implemented method includes: receiving, by a computing device, information regarding a range in which an Internet-of-Things (IoT) network is to be implemented; determining, by the computing device, respective detection scores for a plurality of IoT devices for each of a plurality of proposed congregation of IoT devices; determining, by the computing device, a minimum number of the plurality of IoT devices to cover the range by incorporating the detection scores into a covariance model; and outputting, by the computing device, information identifying the minimum number of the plurality of IoT devices for designing the IoT network.

In an aspect of the invention, there is a computer program product for determining placement of a minimum number of Internet-of-Things (IoT) devices for designing an IoT network. The computer program product includes a computer readable storage medium having program instructions embodied therewith, the program instructions executable by a computing device to cause the computing device to: receive information regarding a range in which an Internet-of-Things (IoT) network is to be implemented; determine actual coverage ranges for each of a plurality of IoT devices using a trained detector; determine a minimum number of the plurality of IoT devices to cover the range by incorporating the detection scores into a covariance model; and output information identifying the minimum number of the plurality of IoT devices for designing the IoT network.

In an aspect of the invention, a system includes: a processor, a computer readable memory and a computer readable storage medium associated with a computing device; program instructions to receive information regarding a range in which an Internet-of-Things (IoT) network is to be implemented; program instructions to divide the range into a collection of random clusters; program instructions to train a detector based on the dividing; program instructions to determine actual coverage ranges for each of a plurality of IoT devices using the trained detector; program instructions to determine a minimum number of the plurality of IoT devices to cover the range by incorporating the detection scores into a covariance model; and program instructions to output information identifying the minimum number of the plurality of IoT devices for designing the IoT network. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to optimizing the placement of internet-of-things (IoT) devices and, more particularly, to optimizing the placement of IoT devices to provide full coverage and minimize coverage overlap. Advantageously, aspects of the present invention include a system that determines the optimal placement of IoT devices for a specific geospatial context (e.g., a specific area) such that full coverage of the area is provided with minimum coverage overlap. Accordingly, an IoT network is designed with the optimal placement of the IoT sensors. In this way, the minimum number of IoT devices are used to provide full coverage to achieve an objective (e.g., an objective relating to collecting a certain class of data for an application), thus saving substantial financial and computer network resources by only incorporating the minimum number of IoT devices in the design and implementation of an IoT network. For example, in a multi-story building, aspects of the present invention minimize the number of IoT devices needed to minimized overlap, such that dozens or potentially hundreds of redundant and unneeded IoT devices are not implemented. As such, substantial computer network and computer processing resources are saved, as fewer IoT devices will be needed to connect to an IoT network. Further, substantial time and money is saved by maintaining a fewer number of IoT devices.

As described herein, aspects of the present invention use a geospatial covariance model to determine an optimized congregation of IoT devices and minimize IoT device coverage overlap for a specific area. Further, aspects of the present invention determine coordinates for IoT device placement to minimize the number of IoT devices while providing full coverage of an area to accomplish an objective (e.g., an objective relating to the collection of a particular class of IoT sensor data in the area). Additionally, or alternatively, aspects of the present invention determine coordinates for IoT device placement to minimize the number of IoT devices while providing full coverage of an area to support an application (e.g., an application that utilizes the collection of a particular class of IoT sensor data in the area). Further, aspects of the present invention train a detector to score the detection capabilities of an IoT sensor and the range of IoT sensors. From the detection information and covariance model, the optimized congregation of IoT devices is determined.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
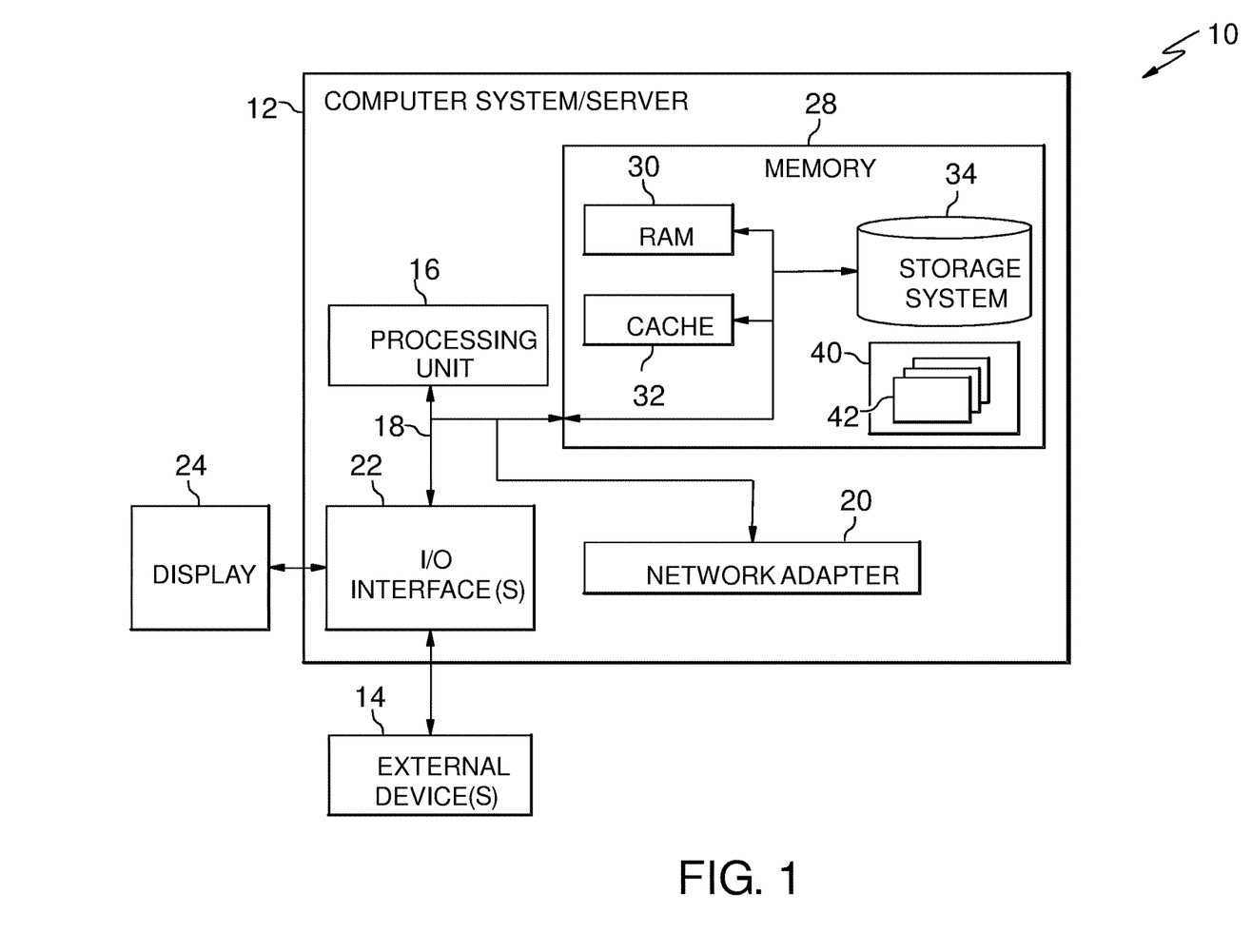
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
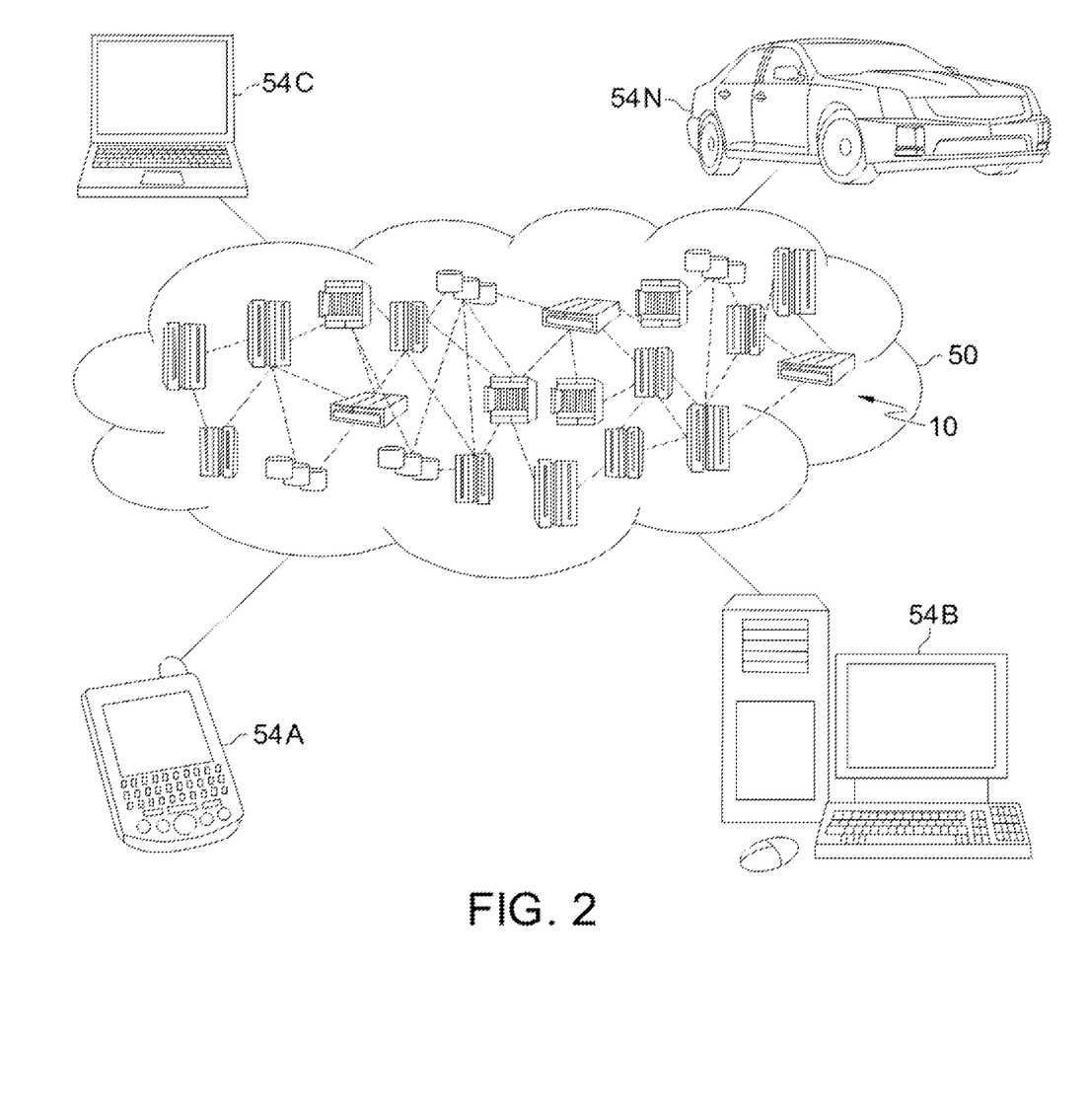
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
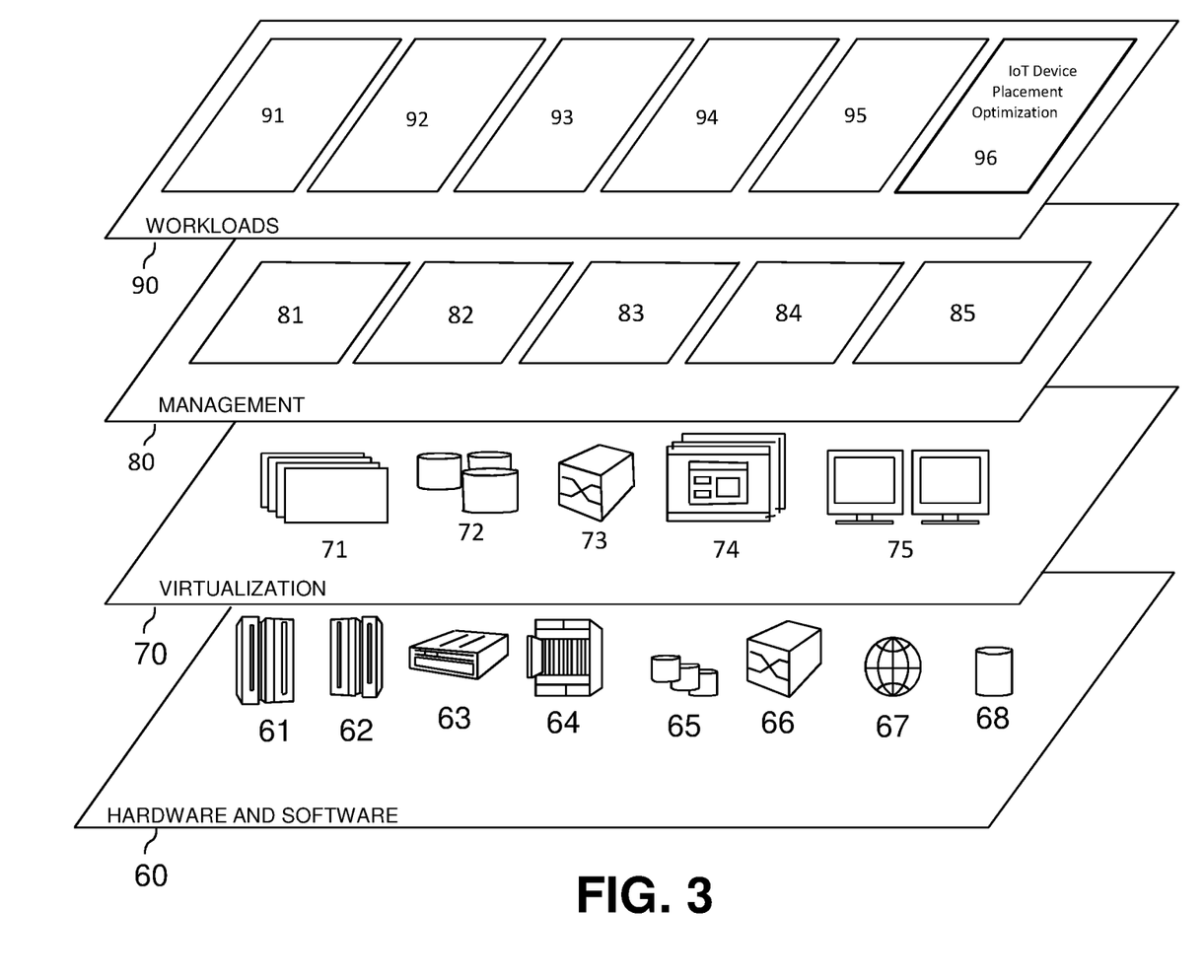
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and IoT device placement optimization 96.

Referring back to FIG. 1, the program/utility 40 includes one or more program modules 42 that generally carry out the functions and/or methodologies of embodiments of the invention as described herein (e.g., such as the functionality provided by IoT device placement optimization 96). For example, in embodiments, the program modules 42 divide a region into random clusters and a collection of clusters, train a detector for a detection scoring algorithm, determine detection scores for proposed IoT device placement options, develop a covariance model to establish an inter-regional movement of each proposed arrangement of the IoT devices 215 against a best fitted proposal, determining a minimum number of IoT devices needed for coverage using the covariance model, and determine the placement of each IoT device in an IoT network design. Other functionalities of the program modules 42 are described further herein such that the program modules 42 are not limited to the functions described above. Moreover, it is noted that some of the modules 42 can be implemented within the infrastructure shown in FIGS. 1-3. In an example, the modules 42 are representative of an IoT placement optimization server 220 as shown in FIG. 5.

Figure 4A:
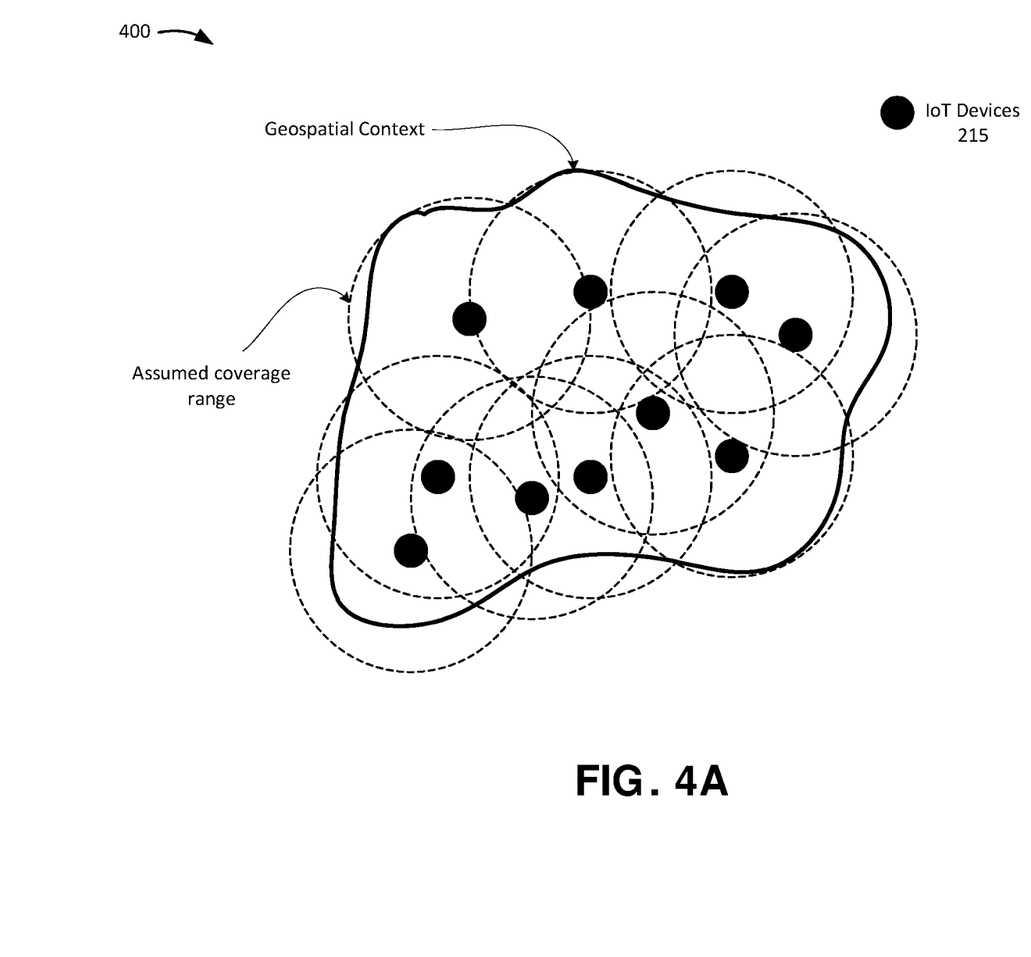
FIGS. 4A and 4B show an overview of an example implementation in accordance with aspects of the present invention
Figure 4B:
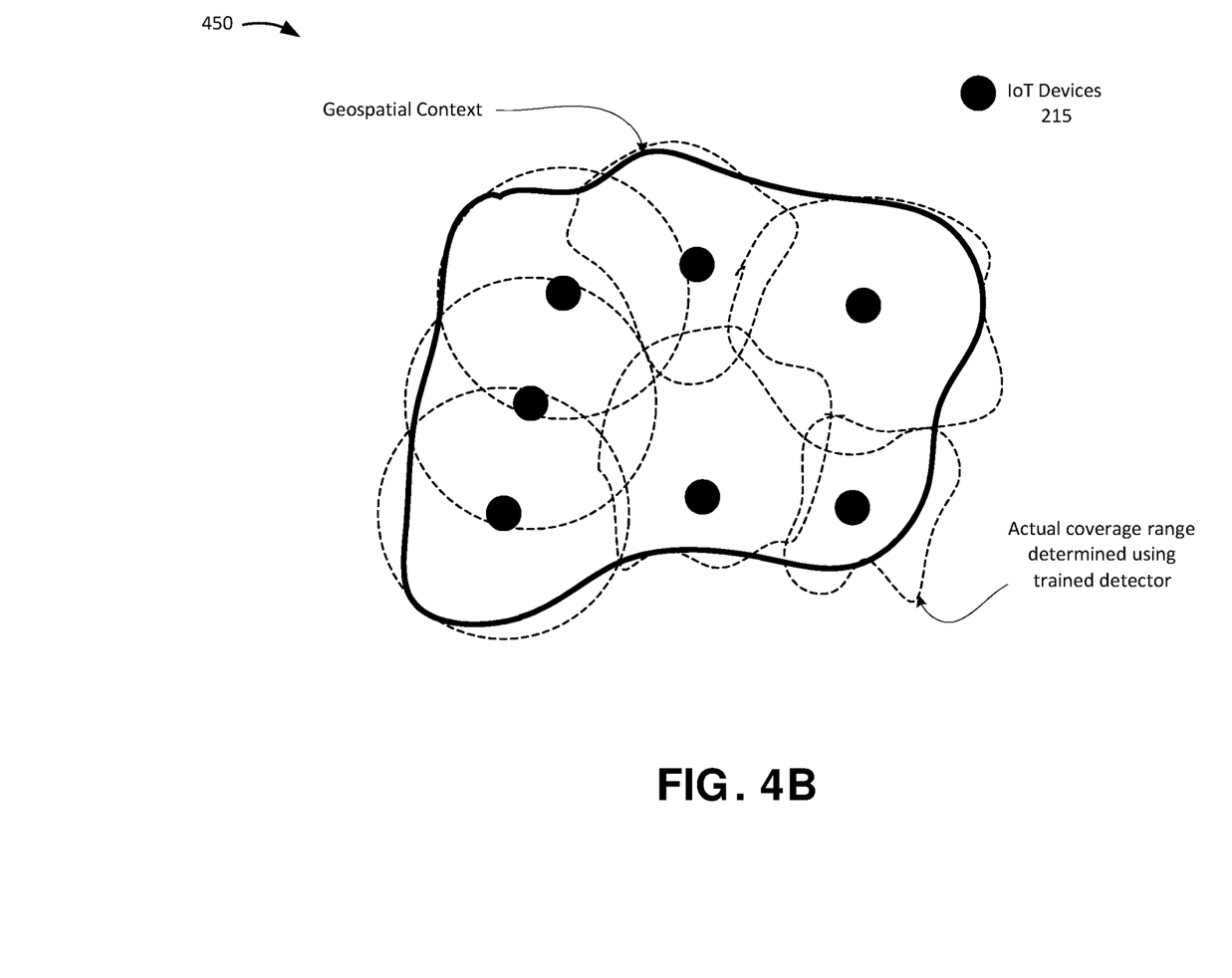

FIGS. 4A and 4B show an overview of an example implementation in accordance with aspects of the present invention. As shown in FIG. 4A, an IoT network design 400 includes multiple IoT devices 215. In embodiments, the IoT network design 400 distributes the IoT devices 215 to provide full coverage of a geospatial context (e.g., a desired coverage area). In embodiments, the distribution is based on an assumed coverage range in which the coverage range of each IoT device 215 is assumed to be regular and homogenous. Further, the IoT network design 400 includes overlapping areas of coverage, as to prevent any uncovered areas or dead-zones. While such the IoT network design 400 provide full coverage of a region, the IoT network design 400 includes a substantial amount of overlap and excess IoT devices 215, since the IoT network design 400 is based on an assumption of regular and homogenous function range of each IoT device 215. Conversely, another IoT network design with fewer IoT devices 215 results in the presence of uncovered areas. Accordingly, aspects of the present invention detect an actual coverage and function range of IoT devices 215 within a particular geospatial context and determine the optimal placement of the IoT devices 215 to minimize the number of IoT devices 215 while providing full coverage.

Referring to FIG. 4B, an IoT network design 450 includes a significantly fewer number of IoT devices 215 to provide full coverage of the geospatial context. For example, the IoT network design 450 is based on actual coverage ranges determined using a trained detector. Further, a covariance model and related algorithms are used to determine the coordinates of the placement of the IoT devices 215 to provide full coverage and minimum overlap.

Figure 5:
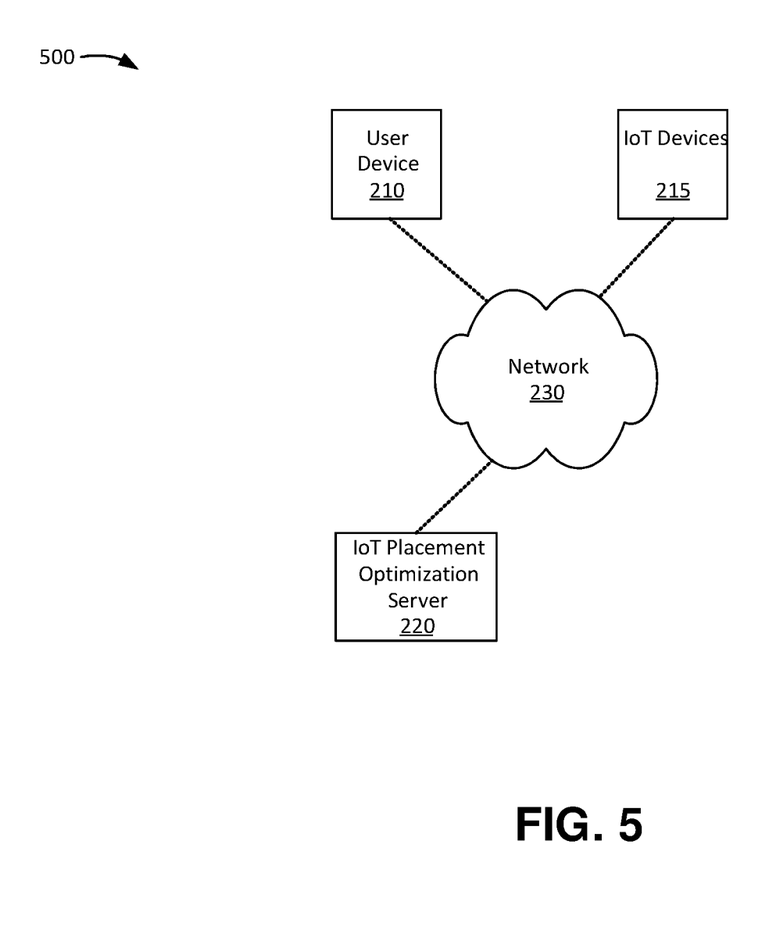
FIG. 5 shows an example environment in accordance with aspects of the present invention.

FIG. 5 shows an example environment in accordance with aspects of the present invention. As shown in FIG. 5, environment 500 includes a user device 210, IoT devices 215, an IoT placement optimization server 220, and a network 230. In embodiments, one or more components in environment 500 corresponds to one or more components in the cloud computing environment of FIG. 2. In embodiments, one or more components in environment 500 includes the components of computer system/server 12 of FIG. 1.

The user device 210 includes a device capable of communicating via a network, such as the network 230. In example embodiments, the user device 210 corresponds to a mobile communication device (e.g., a smart phone or a personal digital assistant (PDA)), a portable computer device (e.g., a laptop or a tablet computer), a desktop computer, a server computer, and/or another type of computing device. In some embodiments, the user device 210 hosts an application that processes data collected by the IoT devices 215. For example, the user device 210 receives data collected by the IoT devices 215 and process the data in connection with any variety of applications (e.g., sensor tracking applications, security applications, trends analysis applications, etc.).

The IoT devices 215 include one or more devices embedded with electronics, software, sensors, actuators, and connectivity/network communications devices to connect and exchange data. In an example embodiment, the IoT devices 215 form an IoT network and are implemented in an IoT network design to gather data related to an objective or application. In an example embodiment, the IoT devices 215 gather a variety of different types/classes of data for different applications and objectives.

The IoT placement optimization server 220 includes one or more computing devices (e.g., such as computer system/server 12 of FIG. 1) that determines an optimal number and placement of the IoT devices 215 for designing an IoT network. As described herein in an example embodiment, the IoT placement optimization server 220 divides a region into random clusters and a collection of clusters, train a detector for a detection scoring algorithm, determine detection scores for proposed IoT device placement options, develop a covariance model to establish an inter-regional movement of each proposal against a best fitted proposal, determining a minimum number of IoT devices needed for coverage using the covariance model, and determine the placement of each IoT device in an IoT network design.

The network 230 includes network nodes, such as network nodes 10 of FIG. 2. Additionally, or alternatively, the network 230 includes one or more wired and/or wireless networks. In an example, the network 230 includes a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 includes a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 includes additional devices and/or networks; fewer devices and/or networks; different devices and/or networks; or differently arranged devices and/or networks than illustrated in FIG. 5. Also, in some implementations, one or more of the devices of the environment 500 performs one or more functions described as being performed by another one or more of the devices of the environment 500. In example embodiments, devices of the environment 500 interconnect via wired connections, wireless connections, or a combination of wired and wireless connections.

Figure 6:
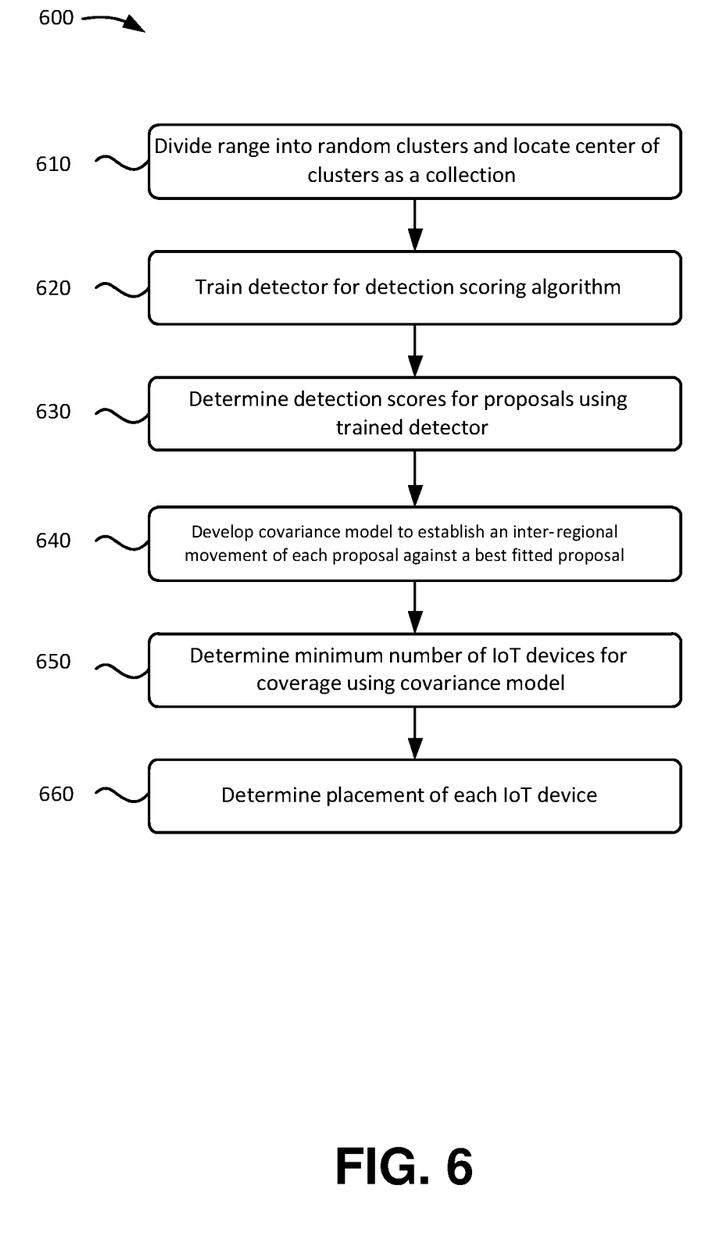
FIG. 6 shows an example flowchart for determining an optimal placement of IoT devices and minimizing the number of IoT devices in the design of an IoT network in accordance with aspects of the present invention.

FIG. 6 shows an example flowchart of a process for determining an optimal placement of IoT devices and minimizing the number of IoT devices in the design of an IoT network. The steps of FIG. 6 is implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 6, process 600 includes dividing a range into random clusters and finding a center of the clusters a collection (step 610). For example, the IoT placement optimization server 220 receives information regarding the boundaries of a range (e.g., in a building, outdoor area, etc.) in which an IoT network is to be implemented to collect and process data and in connection with an application or objective. In an example embodiment, the IoT placement optimization server 220 divides the range into clusters and locates the center of these clusters as a collection C. The range to be covered by the IoT devices 215 is considered as a locational image and broken down into clusters. At any point in time, the IoT devices 215 would expect "regular" coverage being defined as a region. Additively, all the regions would be covered by the IoT devices 215 so that no blind spots for coverage exist.

In embodiments, machine learning is implemented in which the IoT placement optimization server 220 learns over optimally covered sites and identifies any irregularity in the current area and examines those irregularities using covariance analysis, as described in greater detail below. The outcome of step 610 is to ensure that the area to be covered be divided into range/regions in the locational image to ensure all the regions would be covered by the IoT devices 215 so that no coverage blind spots exist. Collection C would collect all of the clusters and would become the binding collection to define the best possible coverage. It is within each element of the collection that the center of the deployed IoT devices 215 is determined. Initially, the function range of each IoT device 215 is assumed to be homogeneous. Thus, any non-linearity in the sensor measurements (discussed in greater detail below) would represent the level of irregularity and trivialness of the geography that is being mapped.

Process 600 also includes training a detector for a detection scoring algorithm (step 620). For example, the IoT placement optimization server 220 constructs a detector that is trained from the "regular" distribution and "other" distribution and then discovering the irregularity based on the detection score patterns. As an illustrative example, an irregular instance is an instance of collected data that resembles "an object-of-interest," but is different from its common appearance or expected result. If the object detection score is viewed as a measure of the likelihood of an image containing the object, then the above postulate could correspond to a relationship in detection scores:

$$f(I_o) < f(I^i) < f(I^r) \qquad (1)$$

where, $f(I^o)$, $f(I^i)$, $f(I^r)$ denotes, detection score of "other object", "irregular object" and "regular object" respectively. The outcome of this step is to train the confidence score of detecting an object in an image, or more specifically, the confidence of whether sensor measurements from an IoT device 215 is captured within a range. From the confidence scores, the detection or functioning range of an IoT device 215 can be determined for any type of range, including a regular or irregular range.

Process 600 further includes determining detection scores for proposals using the trained detector (step 630). Each topology or possible congregation and placement of IoT devices 215 in the IoT network design is referred to as a proposal and the fitment of the proposal to the problem at hand is represented by its dimensions. As described herein, the IoT placement optimization server 220 use selective search to extract a set of regular patterns for each IoT network configuration or arrangement/placement of IoT devices 215 (e.g., each proposal). Proposals that are part of the extracted set of regular patterns are referred to as an instance. Then each region L is represented by a $N_i \times D$ matrix $X_i$ where $N_i$ denotes the number of proposals and D represents the dimensionality of the proposal representations. In example embodiments, the IoT placement optimization server 220 optimizes the following objective function to train the detector.

$$\gamma = \Sigma_I \log(1 + e^{-y^I max_j \{w^T x_j^i + b\}}) \qquad (2)$$

where $w \in R^{D \times 1}$ serves as an object detector, $x_j^i$ indicates the $j^{th}$ instance of the $i^{th}$ training regular instance and $\{w^T x_j^i + b\}$ is its detection score, max $\{\ \}$ is a comprehensive score, which is calculated by aggregation by max-pooling operator, $y^i \in \{1, -1\}$ serves as the instance polarity, and w and b can be learned via back-propagation.

In an example embodiment, the detector is further trained using the equation 2, which represents each detection instance being learnt by back propagation. In embodiments, the IoT placement optimization server 220 uses a Gaussian process as assumptions are made that any finite number of random variables drawn from the Gaussian process follow a joint Gaussian distribution and this distribution is fully characterized by a mean function m(x) and a covariance function k(x, x'). In embodiments, the detection score Y is treated as a random variable. Thus, the mean function is defined as $$m(Y) = \mu | \mu > 0 \text{ when } f(x) \to f(I^r) \qquad (3)$$

where μ is a constant learned through parameter estimation. The outcome step 630 is the defined detection score for an object in a set of data captured by an IoT device 215. As described herein, a detection score corresponds to an actual coverage range of an IoT device 215 (e.g., such as the actual coverage range shown in FIG. 4B, as an illustrative example).

Process 600 also includes developing a covariance model to establish an inter-regional movement of each proposal against a best fitted proposal (step 640). For example, the IoT placement optimization server 220 defines the inter-region covariance function by leveraging the spatial relationship between a proposal and the proposal with the maximum detection score within the same region as this representation. Assuming the maximum-scored proposal in a region is $I^i$ is $s_{max}{}^i$, the representation of a proposal 's' in $I^i$ is defined as a covariance measure of training data set, $$\alpha(s) = [IoU[s, s_{max}{}^i], c(s, s_{max}{}^i)] \qquad (4)$$

where IoU$[s, s_{max}{}^i]$ denotes intersection-over-union between $s$ and $s_{max}{}^i$ and $c(s, s_{max}{}^i)$ denotes normalized distances between the centers of $s$ and $s_{max}{}^i$. A covariance a establishes the inter-regional movement of each proposal against the best fitted proposal in the system. These two measurements reflect a proposal's overlapping degree, distance to the maximum-scored proposal and indirectly the size of the proposal.

In an example embodiment, the IoT placement optimization server 220 combines the above two measurements with the inner image covariance model and defines $$\beta(s, s') = \frac{2s(s \cap s')}{s(s \cap s') + s(s \cup s')} \qquad (5)$$

where, S stands for the area. In an example embodiment, with continuous iterations, the IoT placement optimization server 220 defines the prediction score for each IoT device 215 in the area S as, $$f(I^Y) = \alpha(s, s_{max}{}^i) + \beta(s, s') \qquad (6)$$

The outcome of this step is prediction score for each IoT device 215 in the area and the prediction score for each proposal, solving with the constraint of minimizing the overlaps and white spaces.

Process 600 further includes determining a minimum number of IoT devices for coverage using the covariance model (step 650). In embodiments, the IoT placement optimization server 220 determines a minimum number of IoT devices for coverage using the covariance model by incorporating detection scores for set of proposals into the covariance model and establishing a covariance matrix. For example, for collection C, let $s_r$ be a set of proposals of regular training edge coverages and $f_r$ be their detection scores. The IoT device 215 establish the covariance matrix K for training data. Given a target set of proposals $s_t$ from a test coverage and their detection scores $f_t$, the IoT placement optimization server 220 uses a joint distribution of $f_r$, $f_t$ such as:

$$\begin{bmatrix} f_r \\ f_t \end{bmatrix} = N\left( \begin{bmatrix} \mu \\ \mu \end{bmatrix}, \begin{bmatrix} K & k(s_r, s_t) \\ k(s_r, s_t)^T & k(s_t, s_t) \end{bmatrix} \right) \qquad (7)$$

where $\mu$ is the mean vector, k $(s_r, s_t)$ is used to calculate the inter-image covariance matrix between training set & testing set, $k(s_t, s_t)$ is used to calculate the inner-image covariance of the test data. In an example embodiment, the IoT placement optimization server 220 calculates the detection scores with their joint distributions based on the training proposals that learn on the learned covariance matrix K.

When equation 7 is solved iteratively, the IoT placement optimization server 220 obtains the likelihood of the testing set given both regular training data and "other class" training data, and the IoT placement optimization server 220 computes the logarithm of the overall number of devices as $$N = \max(\log_p(f_t | f_r), \log_p(f_t | f_0)) \qquad (8)$$

N, when obtained, accounts for all the inter-device covariances and tested for likelihood of any overlap (at randomly sampled points) of coverage by more than IoT device 215 geospatially. The outcome of step 650 is the determination of the minimum number of edge devices required for coverage.

Process 600 also includes determining the placement of each IoT device (step 660). For example, the IoT placement optimization server 220 determines the placement (e.g., coordinates) of each IoT device 215 using the mean vector and the number of IoT devices 215 determined at step 650. The coordinates of each IoT device 215 that will be a part of the optimal collection of the IoT devices 215 is determined using the below example equation:

$$U_N(G_x \circ G_y) \left( \begin{bmatrix} i_x \\ i_y \end{bmatrix} \begin{bmatrix} \mu & i(s_r, s_t) \\ \mu_i(s_r, s_t)^T & (s_t, s_t) \end{bmatrix} \right) \qquad (9)$$

where, $G_x$ represents the X coordinate of the $i^{th}$ Sensor $G_y$ represents the Y coordinate of the $i^{th}$ Sensor $\mu$ is the mean vector, and T is the proposal transient. In embodiments, the IoT placement optimization server 220 outputs information identifying the minimum number of IoT devices 215 and their coordinates in order for an IoT network within the range to be implemented. In embodiments, the IoT placement optimization server 220 outputs a report or graphic that represents the boundaries of the range, and the coordinates of the IoT devices 215 within the range. In this way, the information provided by the IoT placement optimization server 220 are used to design and implement an IoT network with the minimum number of IoT devices 215 are used to provide full coverage achieve an objective (e.g., an objective relating to collecting a certain class of data for an application), thus saving substantial financial and computer network resources by only incorporating the minimum number of IoT devices in the design and implementation of an IoT network.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a computing device, information regarding a range in which an Internet-of-Things (IoT) network is to be implemented;
determining, by the computing device, respective detection scores for a plurality of IoT devices for each of a plurality of proposed congregation of IoT devices;
determining, by the computing device, a minimum number of the plurality of IoT devices to cover the range by incorporating the detection scores into a covariance model;
outputting, by the computing device, information identifying the minimum number of the plurality of IoT devices for designing the IoT network;
dividing, by the computer device, the range into a collection of random clusters;
training, by the computer device, a detector based on the dividing, wherein the determining the detection scores is based on the training the detector;
wherein the training the detector is based on an objective function, the objective function being based on an object detector, an instance of a training regular instance, a detection score, and a comprehensive score, and
the object detector is learned via back-propagation.

2. The method of claim 1, further comprising determining a placement of each of the minimum number of the plurality of IoT devices based on the covariance model, wherein the outputting further comprises outputting information identifying the placement of each of the minimum number of the plurality of IoT devices for designing the IoT network.

3. The method of claim 1, wherein the objective function is $\gamma = \Sigma_l \log(1+e^{-y_j^i max_j \{w^T x_j^i + b\}})$ where $w \in R^{D \times I}$ serves as the object detector, $x_j^i$ indicates a $j^{th}$ instance of an $i^{th}$ training regular instance, $\{w^T x_j^i + b\}$ is the detection score, max{ } is the comprehensive score, and w and b are learned via back-propagation.

4. The method of claim 3, wherein a defined detection score is determined using the function $m(Y)=\mu|\mu>0$ when $f(x) \to \theta(I^r)$ where $\mu$ is a constant learned through parameter estimation.

5. The method of claim 1, wherein the covariance model is based on a function $\alpha(s)=[IoU[s,s_{max}^i], c(s,s_{max}^i)]$ where $IoU[s,s_{max}^i]$ denotes intersection-over-union between s and $s_{max}^i$ and $c(s,s_{max}^i)$ denotes normalized distances between the centers of s and $s_{max}^i$,
wherein s is an area, and a maximum scored proposal in a region $I^i$ is $s_{max}^i$.

6. The method of claim 5, wherein the variance model establishes an inter-regional movement of each proposed congregation against a best fitted proposal.

7. The method of claim 1, wherein the respective detection scores correspond to an actual coverage range of the plurality of IoT devices.

8. The method of claim 1, wherein a service provider at least one of creates, maintains, deploys and supports the computing device.

9. The method of claim 1, wherein the receiving the information regarding the range, the determining the respective detection scores, the determining the minimum number of the plurality of IoT devices to cover the range, and the outputting the information identifying the minimum number of the plurality of IoT devices for designing the IoT network are provided by a service provider on a subscription, advertising, and/or fee basis.

10. The method of claim 1, wherein the computing device includes software provided as a service in a cloud environment.

11. The method of claim 1, further comprising deploying a system for determining placement and a minimum number of IoT devices for designing the IoT network, comprising providing a computer infrastructure operable to perform the receiving the information regarding the range, the determining the respective detection scores, the determining the minimum number of the plurality of IoT devices to cover the range, and the outputting the information identifying the minimum number of the plurality of IoT devices for designing the IoT network.

12. A computer program product for determining placement of a minimum number of Internet-of-Things (IoT) devices for designing an IoT network, the computer program product comprising a computer readable storage medium having program instructions embodied therewith, the program instructions executable by a computing device to cause the computing device to:
receive information regarding a range in which an Internet-of-Things (IoT) network is to be implemented;
determine actual coverage ranges for each of a plurality of IoT devices using a trained detector;
determine a minimum number of the plurality of IoT devices to cover the range by incorporating detection scores into a covariance model; and
output information identifying the minimum number of the plurality of IoT devices for designing the IoT network,
wherein the covariance model is based on a function $\alpha(s)=[IoU[s,s_{max}^i], c(s,s_{max}^i)]$ where $IoU[s,s_{max}^i]$ denotes intersection-over-union between s and $s_{max}^i$ and $c(s,s_{max}^i)$ denotes normalized distances between the centers of s and $s_{max}^i$, and
s is an area, and a maximum scored proposal in a region $I^i$ is $s_{max}^i$.

13. The computer program product of claim 12, wherein the program instructions further cause the computing device to: determine a placement of each of the minimum number of the plurality of IoT devices based on the covariance model, wherein the outputting further comprises outputting information identifying the placement of each of the minimum number of the plurality of IoT devices for designing the IoT network.

14. The computer program product of claim 12, wherein the trained detector is trained based on an objective function.

15. The computer program product of claim 12, wherein the covariance model establishes an inter-regional movement of each proposed congregation against a best fitted proposal.

16. A system comprising:
a processor, a computer readable memory and a computer readable storage medium associated with a computing device;
program instructions to receive information regarding a range in which an Internet-of-Things (IoT) network is to be implemented;
program instructions to divide the range into a collection of random clusters;
program instructions to train a detector based on the dividing;
program instructions to determine actual coverage ranges for each of a plurality of IoT devices using the trained detector;
program instructions to determine a minimum number of the plurality of IoT devices to cover the range by incorporating detection scores into a covariance model; and
program instructions to output information identifying the minimum number of the plurality of IoT devices for designing the IoT network,
wherein the determining the detection scores is based on the training the detector,
the training the detector is based on an objective function, the objective function being based on an object detector, an instance of a training regular instance, a detection score, and a comprehensive score,
the object detector is learned via back-propagation, and
the program instructions are stored on the computer readable storage medium for execution by the processor via the computer readable memory.

17. The system of claim 16, wherein the training the objective function is $\gamma=\Sigma_l \log(1+e^{-y^l max_j\{w^T x_j^i+b\}})$ where $w \in R^{D \times I}$ serves as the object detector, $x_j^i$ indicates a $j^{th}$ instance of an $i^{th}$ training regular instance, $\{w^T x_j^i+b\}$ is the detection score, max{ } is the comprehensive score, and w and b are learned via back-propagation.

18. The computer program product of claim 12, wherein the objective function is $\gamma=\Sigma_l \log(1+e^{-y^l max_j\{w^T x_j^i+b\}})$ where $w \in R^{D \times I}$ serves as the object detector, $x_j^i$ indicates a $j^{th}$ instance of an $i^{th}$ training regular instance, $\{w^T x_j^i+b\}$ is the detection score, max{ } is the comprehensive score, and w and b are learned via back-propagation.

* * * * *